(12) United States Patent
Knudsen

(10) Patent No.: US 7,971,700 B1
(45) Date of Patent: Jul. 5, 2011

(54) LOADER ATTACHMENT FOR USE WITH A MOBILE CONVEYOR SYSTEM

(76) Inventor: Richard Knudsen, Calimesa, CA (US)

( * ) Notice: Subject to any disclaimer, the term of this patent is extended or adjusted under 35 U.S.C. 154(b) by 120 days.

(21) Appl. No.: 12/557,281

(22) Filed: Sep. 10, 2009

Related U.S. Application Data

(60) Provisional application No. 61/096,819, filed on Sep. 14, 2008.

(51) Int. Cl.
*B65G 21/00* (2006.01)

(52) U.S. Cl. .................................. 198/312; 198/803.14

(58) Field of Classification Search .................. 198/300, 198/312, 313, 315, 316.1, 867.11, 867.14, 198/803.14; 414/391, 471, 495, 746.7
See application file for complete search history.

(56) References Cited

U.S. PATENT DOCUMENTS

| | | | | |
|---|---|---|---|---|
| 1,669,999 | A * | 5/1928 | Olsen | 414/794.5 |
| 3,825,107 | A * | 7/1974 | Cary et al. | 198/313 |
| 5,429,226 | A * | 7/1995 | Ensch et al. | 198/803.14 |
| 6,213,352 | B1 * | 4/2001 | Boyer, Jr. | 141/391 |
| 6,966,418 | B2 * | 11/2005 | Crookston | 198/312 |
| 7,681,691 | B1 * | 3/2010 | Miller | 414/11 |
| 2005/0103596 | A1 * | 5/2005 | Crookston | 198/312 |
| 2006/0070845 | A1 * | 4/2006 | Crookston | 198/312 |

* cited by examiner

*Primary Examiner* — James R Bidwell
(74) *Attorney, Agent, or Firm* — Eric Karich

(57) ABSTRACT

A loader attachment for use with a mobile conveyor system has a base plate, a C-shaped support structure, and a cable. The base plate is dimensioned to be supported upon a conveyor belt of the mobile conveyor system. The C-shaped support structure extends upwardly from the base plate for supporting a roofing supply during transport on the conveyor belt. The cable is adapted to be attached to a top end of the C-shaped support structure and the base plate for securing the roofing supply on the C-shaped support structure.

8 Claims, 3 Drawing Sheets

LOADER ATTACHMENT FOR USE WITH A MOBILE CONVEYOR SYSTEM

CROSS-REFERENCE TO RELATED APPLICATIONS

This application for a utility patent claims the benefit of U.S. Provisional Application No. 61/096,819, filed Sep. 14, 2008.

BACKGROUND OF THE INVENTION

1. Field of the Invention

This invention relates generally to conveyor systems, and more particularly to a loader attachment for use with a mobile conveyor system.

2. Description of Related Art

Mobile conveyor systems are typically used to transport roofing supplies to the rooftops of buildings under construction. The mobile conveyor systems include conveyor belts that continually transport up to the roof any supplies placed upon the conveyor belt.

Some roofing supplies, and in particular rolls of single ply roofing membranes, are difficult to transport using such mobile conveyor systems. What is needed in the art is therefore an attachment for a mobile conveyor system that enables such supplies to be more easily and safely transported to the rooftop.

The prior art teaches mobile conveyor system. However, the prior art does not teach a mobile conveyor system that includes a loader attachment that enables the easy and safe transport of certain roofing supplies, such as the single ply roofing membranes, to the rooftop. The present invention fulfills these needs and provides further related advantages as described in the following summary.

SUMMARY OF THE INVENTION

The present invention teaches certain benefits in construction and use which give rise to the objectives described below.

The present invention provides a loader attachment for use with a mobile conveyor system. The loader attachment includes a base plate dimensioned to be supported upon the conveyor belt; a C-shaped support structure extending upwardly from the base plate, the C-shaped support structure being adapted to support the roofing supply during transport on the conveyor belt; and a cable adapted to be attached to a top end of the C-shaped support structure and the base plate for securing the roofing supply on the C-shaped support structure.

A primary objective of the present invention is to provide a loader attachment and method having advantages not taught by the prior art.

Another objective is to provide a loader attachment and method that enables roofing supplies, such as rolls of single ply roofing membranes, to be easily and safely transported to a rooftop using standard conveyor systems.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a loader attachment 10 for use with a mobile conveyer system 20 for transporting a roofing supply 12 to a rooftop 14.

Figure 1:
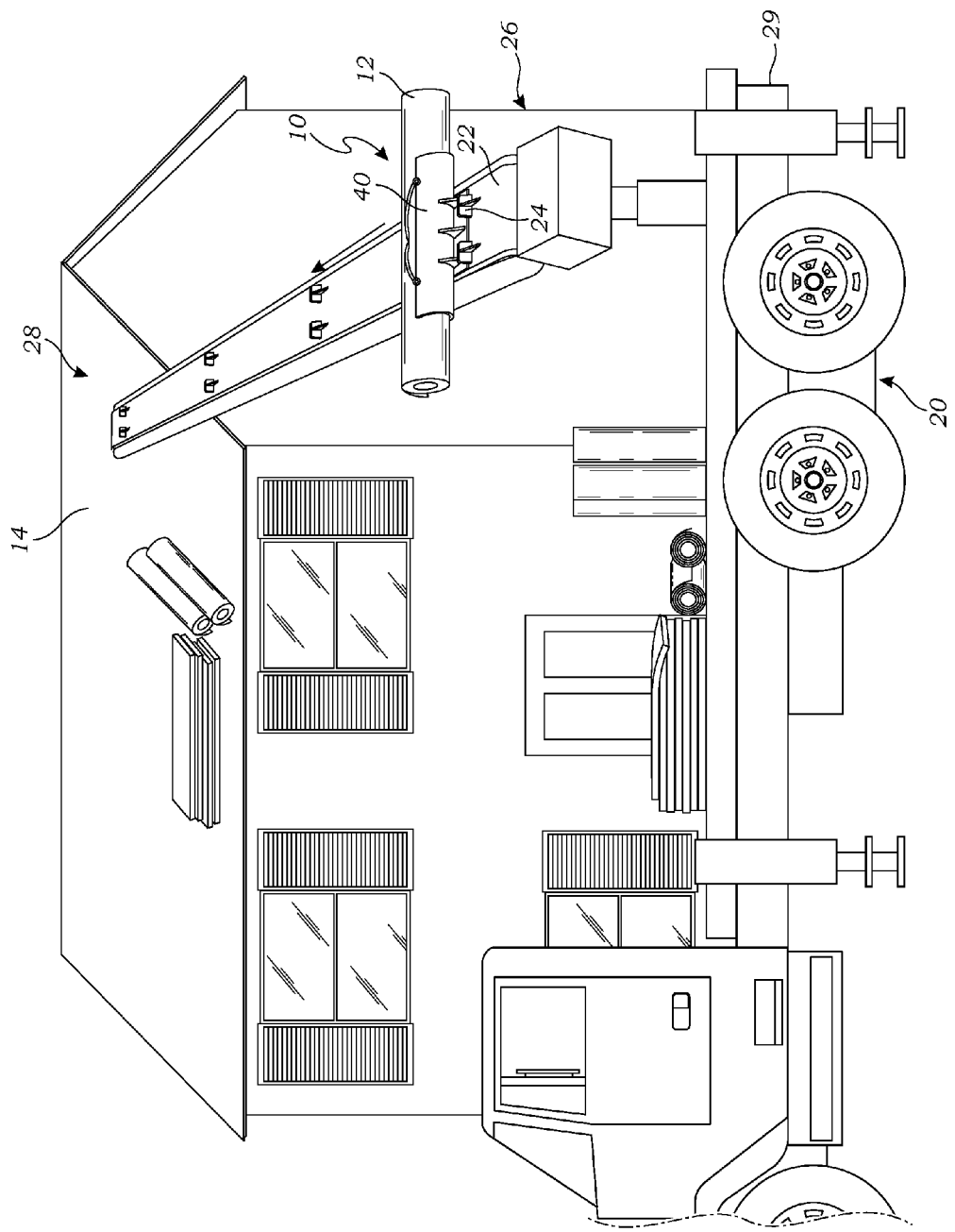
FIG. 1 is a perspective view of a mobile conveyor system that includes a loader attachment being used to transport a roll of single ply roofing membrane to a rooftop, according to one embodiment of the present invention.

FIG. 1 is a perspective view of the mobile conveyor system 20 and the loader attachment 10 being used to transport a roll of single ply roofing membrane to a rooftop 14, according to one embodiment of the present invention. As shown in FIG. 1, the mobile conveyor system 20 includes a conveyor belt 22 having a loading end 26 and an unloading end 28, with the unloading end 28 being adapted to be positioned adjacent the rooftop 14. The conveyor belt 22 may be mounted on a vehicle 29, as illustrated, or other form of base or other support means that enables the conveyor belt 22 to be operably positioned for loading roofing supplies 12 onto the rooftop 14 (of, for example, a residential home, commercial building, or other structure). The conveyor belt 22 may include paddles 24 or similar cross-supports for holding items on the conveyor belt 22. Since such mobile conveyor systems 20 are well known in the art, they are not described in greater detail herein.

Figure 2:
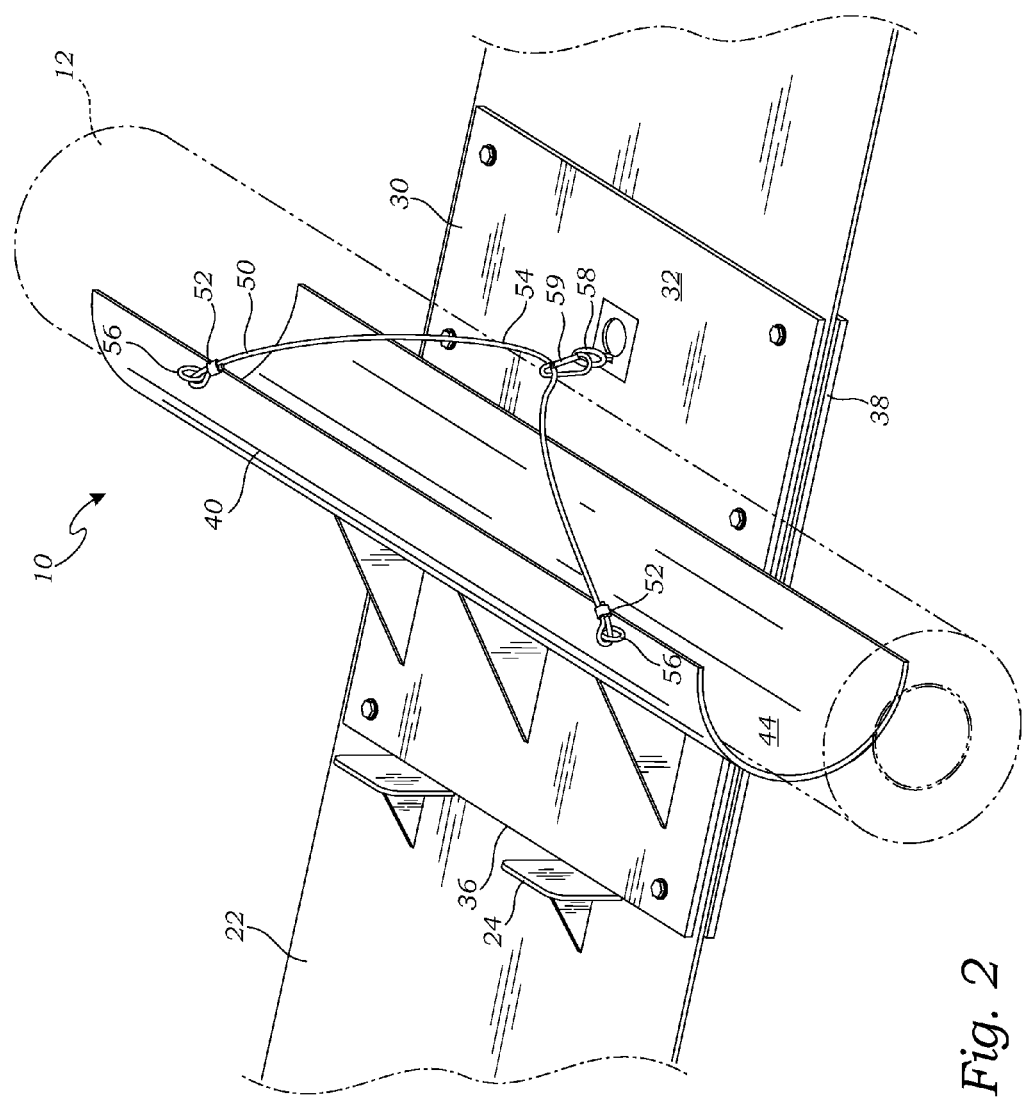
FIG. 2 is a perspective view of the loader attachment that is utilized on the mobile conveyor system of FIG. 1.
Figure 3:
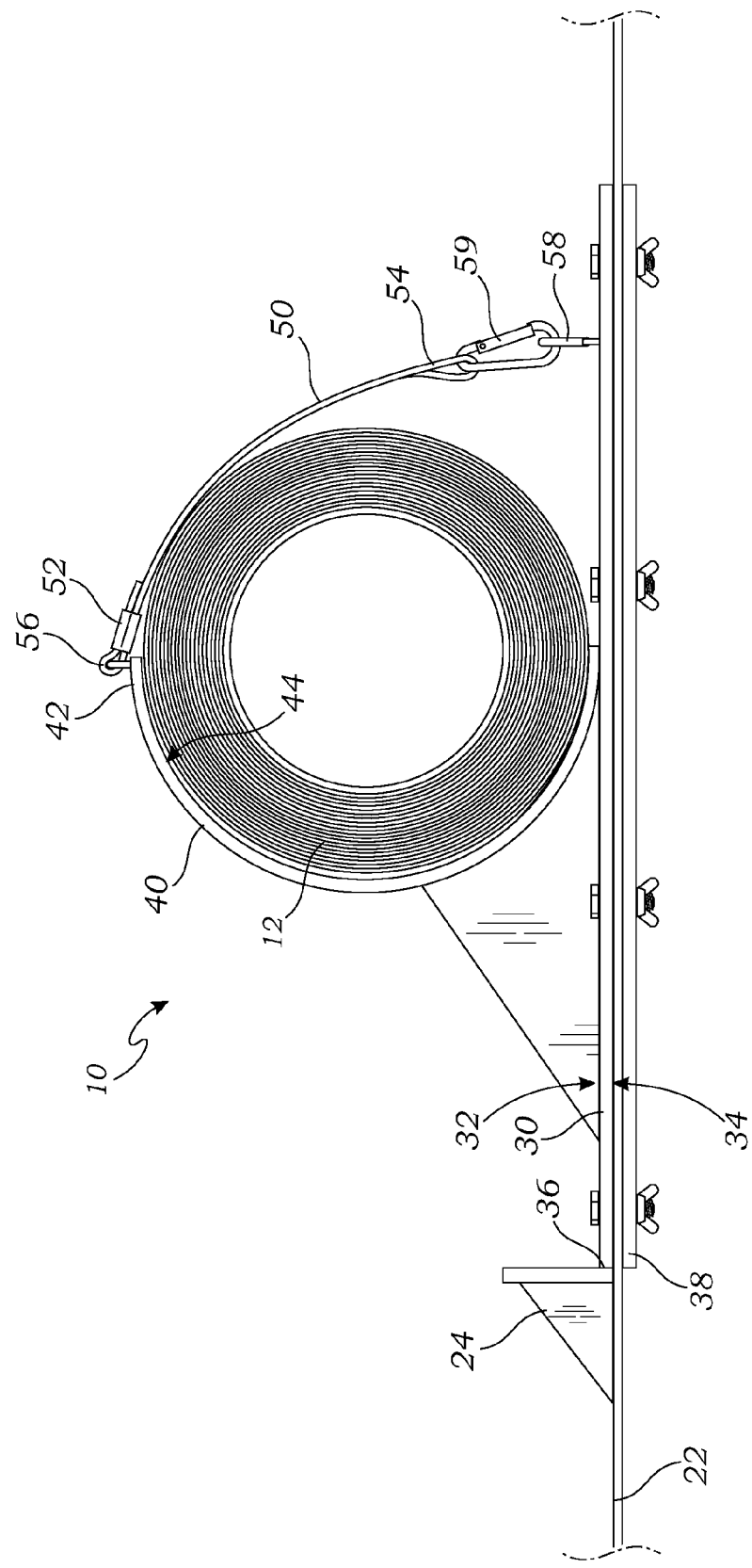
FIG. 3 is a side elevational view thereof.

FIG. 2 is a perspective view of the loader attachment 10 that is utilized on the mobile conveyor system 20 of FIG. 1. FIG. 3 is a side elevational view thereof. As illustrated in FIGS. 2 and 3, the loader attachment 10 has a base plate 30 dimensioned to be supported upon the conveyor belt 22, and a C-shaped support structure 40 adapted to hold and support the roofing supply 12, as described in greater detail below. The base plate 30 includes a top surface 32, an opposed bottom surface 34, and an edge 36.

The term "base plate 30" is hereby defined to include any solid foundation structure that functions to support the C-shaped support structure 40 on the conveyor belt 22, as described herein. In one embodiment, the base plate 30 may be a rigid steel sheet, and the edge 36 is adapted to abut the paddle 24 of the conveyor belt 22. The base plate 30 may be generally rectangular in shape, although other shapes may also be utilized.

In the embodiment of FIGS. 2-3, the loader attachment 10 further includes a back plate 38 adapted to be positioned beneath the conveyor belt 22 opposite the base plate 30. Fasteners 39 (e.g., nuts and bolts, screws, rivets, or other forms of fasteners) may be used for fastening the base plate 30 and the back plate 38 together to sandwich the conveyor belt 22 therebetween. The back plate 38 is preferably strong and abrasion resistant. In one embodiment, the back plate 38 may be constructed of UHMW polyethylene, although other materials known in the art may also be used.

As illustrated in FIGS. 2-3, the C-shaped support structure 40 extends upwardly from the base plate 30 to a top end 42, and includes an inner surface 44 adapted to support the roofing supply 12 during transport on the conveyor belt 22. For purpose of this application, the term "C-shaped" is hereby defined to include any functionally similar shape or arrangement, even if not actually shaped like a "C," that extend upwardly to a height that is greater than the roofing supply 12, and that functions to partially surround and support the roofing supply 12. Examples of alternative structures include but are not limited to loader forks, support brackets of different shapes, self supporting sheets and/or rods of various configurations devised by those skilled in the art, and other similar and/or equivalent structures. In one embodiment, the C-shaped support structure 40 may be a rigid steel concave sheet structure adapted to partially surround and abut a roll of single ply roofing material.

A cable 50 is adapted to be attached to the top end 42 of the C-shaped support structure 40 and the base plate 30 for securing the roofing supply 12 on the C-shaped support structure 40. For purpose of this application, the term "cable" is hereby defined to include any form of wire, chain, rope, cord, connector rod, rigid hatch element, fastener, or other similar structure or device for fastening the roofing supply 12 against the C-shaped support structure 40. In one embodiment, the cable 50 may be a coated steel cable that includes ends 52 separated by a middle portion 54. The ends 52 may be attached to attachment points 56 spaced upon an upper edge 36 of the C-shaped support structure 40. A fastener hook 59 may be used to fasten the middle portion 54 of the cable 50 to the base plate 30 (e.g., to an attachment point 58 such as a ring).

The loader attachment 10 enables a method for transporting the roofing supply 12 to the rooftop 14. The method comprises the steps of first providing the mobile conveyor system 20 and loader attachment 10, as described above. The base plate 30 is mounted on the conveyor belt 22 and the back plate 38 is positioned beneath the conveyor belt 22 opposite the base plate 30 so that they may be fastened together to sandwich the conveyor belt 22 therebetween.

The roofing supply 12 (e.g., the roll of single ply roofing membrane, or other roofing material) is positioned adjacent the C-shaped support structure 40 while the C-shaped support structure 40 is at the loading end 26 of the conveyor belt 22. The cable 50 is fastened to both a top end 42 of the C-shaped support structure 40 and the base plate 30, thereby securing the roofing supply 12 against the C-shaped support structure 40. The conveyor belt 22 is then advanced to move the roofing supply 12 to the unloading end 28 of the conveyor belt 22, so that the roofing supply 12 may be unloaded to the rooftop 14.

Such a method is particularly suited for transporting single ply roofing membranes because the rolls of material may be particularly difficult to load using conventional systems. Single ply roofing membranes may include, for example, STEVENS EP® (TPO, thermoplastic polyolefin); STEVENS EV® (Elvaloy®); STEVENS CSPE™ (made with Hypalon® from DuPont) Roofing Systems; and other similar rolls of sheet materials used in roofing. The trademarks are owned by JPS Elastomerics Corporation and DuPont Corporation).

As used in this application, the words "a," "an," and "one" are defined to include one or more of the referenced item unless specifically stated otherwise. Also, the terms "have," "include," "contain," and similar terms are defined to mean "comprising" unless specifically stated otherwise. The terminology used in the specification is hereby defined to include similar and/or equivalent terms, and/or alternative embodiments that would be considered obvious to one skilled in the art given the teachings of the present patent application.

What is claimed is:

1. A loader attachment for use with a mobile conveyor system, the conveyor system having a conveyor belt for transporting a roofing supply to a rooftop, the loader attachment comprising:
   a base plate dimensioned to be supported upon the conveyor belt;
   a C-shaped support structure extending upwardly from the base plate, the C-shaped support structure being adapted to support the roofing supply during transport on the conveyor belt; and
   a cable adapted to be attached to a top end of the C-shaped support structure and the base plate for securing the roofing supply on the C-shaped support structure.

2. The loader attachment of claim 1, further comprising:
   a back plate adapted to be positioned beneath the conveyor belt opposite the base plate; and
   fasteners for fastening the base plate and the back plate together to sandwich the conveyor belt therebetween.

3. The loader attachment of claim 1, wherein the base plate is a rigid steel plate having an edge adapted to abut a paddle of the conveyor belt.

4. The loader attachment of claim 1, wherein the C-shaped support structure is a rigid steel concave structure adapted to abut a roll of single ply roofing material.

5. The loader attachment of claim 1, wherein the cable includes ends separated by a middle portion, and the ends are attached to attachment points spaced upon an upper edge of the C-shaped support structure; and further comprising a fastener hook that functions to fasten the middle portion of the cable to the base plate.

6. A loader attachment for transporting a roofing supply to a rooftop, the loader attachment comprising:
   a mobile conveyor system, the conveyor system having a conveyor belt;
   a base plate dimensioned to be supported upon the conveyor belt;
   a back plate adapted to be positioned beneath the conveyor belt opposite the base plate;
   fasteners for fastening the base plate and the back plate together to sandwich the conveyor belt therebetween;
   a C-shaped support structure extending upwardly from the base plate, the C-shaped support structure being adapted to support the roofing supply during transport on the conveyor belt; and
   a cable adapted to be attached to a top end of the C-shaped support structure and the base plate for securing the roofing supply on the C-shaped support structure.

7. A method for transporting a roofing supply to a rooftop, the method comprising the steps of:
   providing a mobile conveyor system having a conveyor belt with a loading end and an unloading end, the unloading end being adapted to be positioned adjacent the rooftop;
   providing a loader attachment, the loader attachment comprising:
      a base plate dimensioned to be supported upon the conveyor belt;
      a back plate adapted to be positioned beneath the conveyor belt opposite the base plate;
      a C-shaped support structure extending upwardly from the base plate, the C-shaped support structure being adapted to support the roofing supply during transport on the conveyor belt; and
      a cable adapted to be attached to a top end of the C-shaped support structure and the base plate for securing the roofing supply on the C-shaped support structure;
   mounting the base plate on the conveyor belt;
   positioning the back plate beneath the conveyor belt opposite the base plate; and
   fastening the base plate to the back plate to sandwich the conveyor belt therebetween.

8. The method of claim 7, further comprising the step of:
positioning the roofing supply adjacent the C-shaped support structure while the C-shaped support structure is at the loading end of the conveyor belt;
fastening the cable to both a top end of the C-shaped support structure and the base plate, thereby securing the roofing supply against the C-shaped support structure;
advancing the conveyor belt to move the roofing supply from the loading end to the unloading end of the conveyor belt; and
unloading the roofing supply to the rooftop.

* * * * *